US011778553B2

(12) United States Patent
Ouchi

(10) Patent No.: US 11,778,553 B2
(45) Date of Patent: Oct. 3, 2023

(54) COMMUNICATION APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/683,577

(22) Filed: Mar. 1, 2022

(65) Prior Publication Data

US 2022/0272631 A1 Aug. 25, 2022

Related U.S. Application Data

(63) Continuation of application No. 15/956,110, filed on Apr. 18, 2018, now Pat. No. 11,304,135.

(30) Foreign Application Priority Data

Apr. 24, 2017 (JP) ................................ 2017-085613

(51) Int. Cl.
*H04W 52/02* (2009.01)
*H04W 72/12* (2023.01)
(Continued)

(52) U.S. Cl.
CPC ... *H04W 52/0216* (2013.01); *H04W 52/0219* (2013.01); *H04W 52/0229* (2013.01); (Continued)

(58) Field of Classification Search
None
See application file for complete search history.

(56) References Cited

U.S. PATENT DOCUMENTS 10,321,485 B1 * 6/2019 Noh ........................ H04W 8/26
2010/0220702 A1 9/2010 Hiroyuki
(Continued)

FOREIGN PATENT DOCUMENTS

| JP | 2006-025181 A | 1/2006 |
| JP | 2006197483 A | 7/2006 |

(Continued)

OTHER PUBLICATIONS

Notification of Reason for Refusal issued by the Korean Intellectual Property Office dated Apr. 23, 2020 in corresponding Korean Patent Application No. 10-2018-0041342, with English translation.

(Continued)

*Primary Examiner* — Duc T Duong
(74) *Attorney, Agent, or Firm* — Carter, DeLuca & Farrell LLP

(57) ABSTRACT

A communication apparatus that includes a transceiver capable of communicating with the first another communication apparatus operable in accordance with information of a schedule for causing another communication apparatus to operate in a communicable state and the second another communication apparatus inoperable in accordance with the information on the schedule is provided, the information being contained in a first radio signal transmitted by the communication apparatus. The communication apparatus controls, by the schedule, the transceiver so as to transmit the second radio signal for limiting transmission of a radio signal by the second other communication apparatus in at least a part of a period in which the first other communication apparatus operates in a communicable state in a case where the first radio signal is transmitted.

20 Claims, 10 Drawing Sheets

(51) Int. Cl.
H04W 74/08 (2009.01)
H04W 72/23 (2023.01)

(52) U.S. Cl.
CPC ... H04W 52/0235 (2013.01); H04W 52/0238 (2013.01); H04W 72/23 (2023.01); H04W 74/0816 (2013.01)

(56) References Cited

U.S. PATENT DOCUMENTS

| | | | |
|---|---|---|---|
| 2013/0258928 A1 | 10/2013 | Wong | |
| 2014/0112229 A1 | 4/2014 | Merlin | |
| 2014/0161064 A1* | 6/2014 | Jafarian | H04W 74/0825 370/328 |
| 2014/0328195 A1 | 11/2014 | Sampath | |
| 2015/0036572 A1* | 2/2015 | Seok | H04W 74/06 370/311 |
| 2015/0237578 A1 | 8/2015 | Gogate | |
| 2015/0327262 A1 | 11/2015 | Kwon | |
| 2015/0327265 A1* | 11/2015 | Lee | H04B 7/15507 370/315 |
| 2015/0382283 A1 | 12/2015 | Wang | |
| 2016/0073433 A1 | 3/2016 | Kwon | |
| 2016/0219510 A1 | 7/2016 | Asterjadhi | |
| 2016/0219522 A1* | 7/2016 | Asterjadhi | H04W 52/0235 |
| 2016/0269993 A1 | 9/2016 | Ghosh | |
| 2017/0055290 A1* | 2/2017 | Lv | H04W 74/0816 |
| 2017/0064633 A1 | 3/2017 | Jia | |
| 2017/0127404 A1* | 5/2017 | Merlin | H04B 7/0413 |
| 2017/0195954 A1 | 7/2017 | Ghosh | |
| 2017/0257888 A1 | 9/2017 | Kneckt | |
| 2017/0273017 A1 | 9/2017 | Gidvani | |
| 2017/0273129 A1 | 9/2017 | Ouchi | |
| 2017/0280388 A1 | 9/2017 | Asterjadhi | |
| 2017/0332286 A1 | 11/2017 | Lepp | |
| 2017/0339680 A1 | 11/2017 | Jia | |
| 2018/0110046 A1 | 4/2018 | Patil | |
| 2018/0192372 A1* | 7/2018 | Park | H04W 52/0229 |
| 2018/0227917 A1 | 8/2018 | Li | |
| 2018/0295573 A1* | 10/2018 | Gidvani | H04W 52/0229 |
| 2018/0295619 A1 | 10/2018 | Su | |
| 2018/0302194 A1 | 10/2018 | Wang | |
| 2018/0302930 A1* | 10/2018 | Wang | H04W 76/10 |
| 2018/0332534 A1 | 11/2018 | Hou | |
| 2019/0007973 A1 | 1/2019 | Lou | |
| 2019/0021055 A1* | 1/2019 | Guo | H04W 52/0229 |
| 2019/0182864 A1* | 6/2019 | Huang | H04L 5/0094 |
| 2019/0261269 A1 | 8/2019 | Choi | |
| 2019/0268850 A1 | 8/2019 | Kim | |

FOREIGN PATENT DOCUMENTS

| | | |
|---|---|---|
| JP | 2006261984 A | 9/2006 |
| JP | 2010093441 A | 4/2010 |
| WO | 2016123395 A1 | 8/2016 |
| WO | 2017062947 A1 | 4/2017 |

OTHER PUBLICATIONS

Japanese Office Action issued in corresponding Japanese Patent Application No. 2017-085613, dated Dec. 22, 2020, pp. 1-2, with English translation.

Hong, H. et al., "MU-RTS/CTS for TWT Protection" IEEE 802.11-16/03 53r2, IEEE (Mar. 2016) pp. 1-13.

Notice of Reasons for Refusal issued by the Japan Patent Office dated Jul. 25, 2022 in corresponding JP Patent Application No. 2021-123562, with English translation.

* cited by examiner

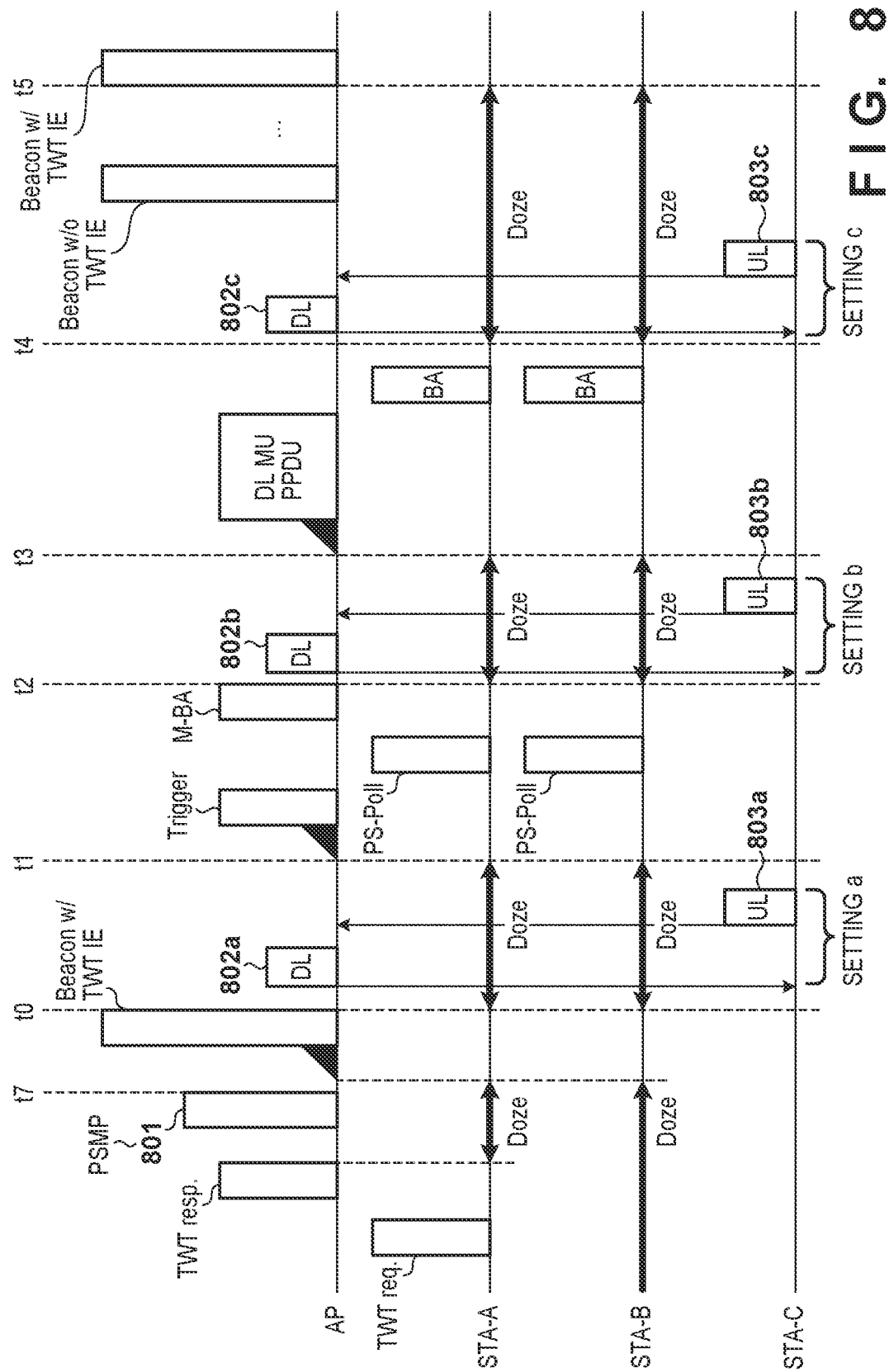

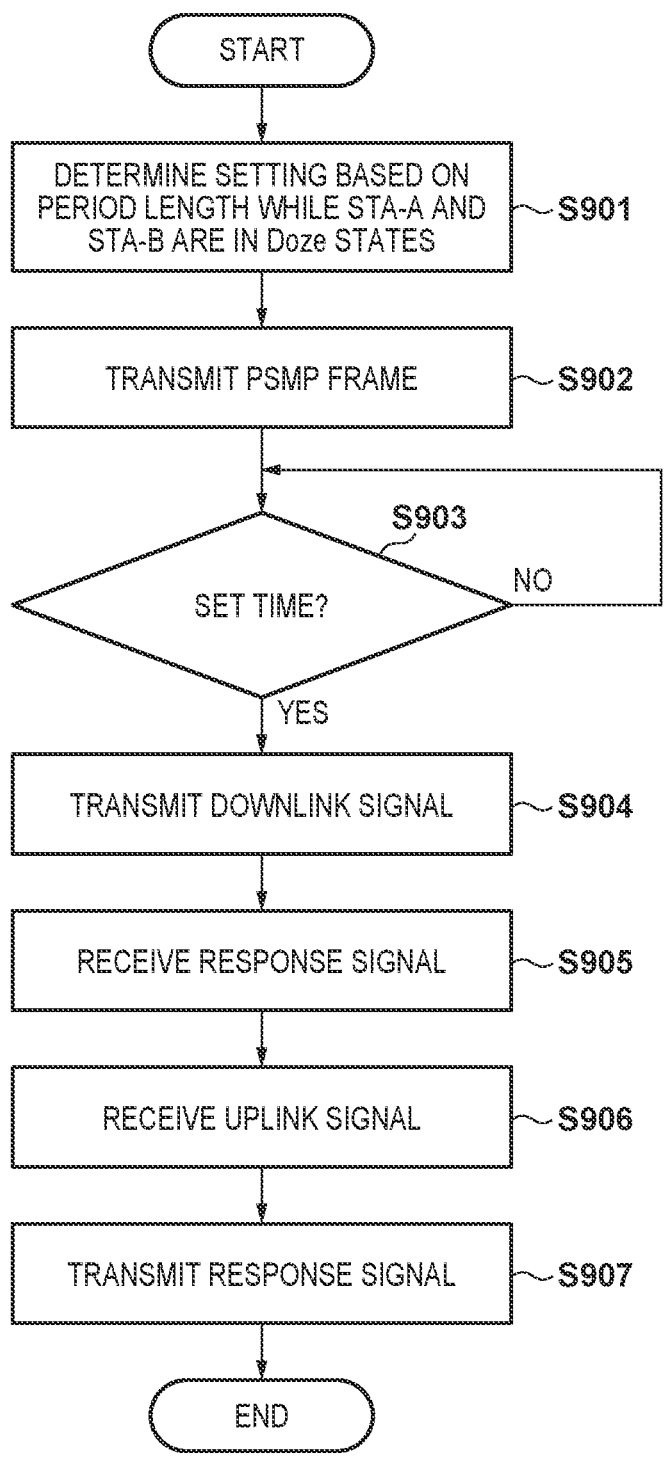

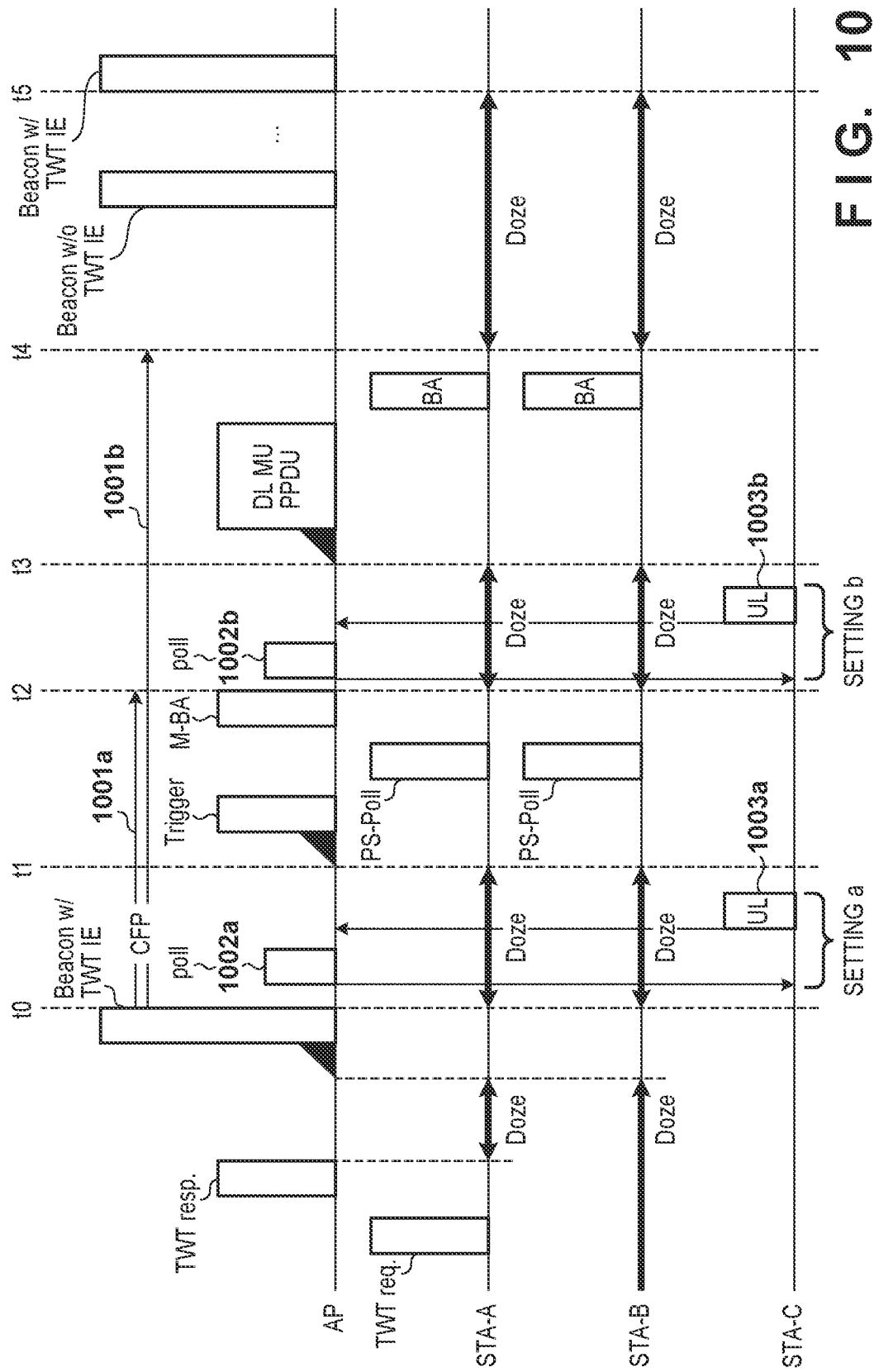

COMMUNICATION APPARATUS, METHOD FOR CONTROLLING THE SAME, AND NON-TRANSITORY COMPUTER-READABLE STORAGE MEDIUM

CROSS REFERENCE TO RELATED APPLICATIONS

This application is a continuation of U.S. patent application Ser. No. 15/956,110, filed on Apr. 18, 2018, which claims the benefit of and priority to Japanese Patent Application No. 2017-085613, filed Apr. 24, 2017, each of which is hereby incorporated by reference herein in their entirety.

BACKGROUND OF THE INVENTION

Field of the Invention

The present invention relates to interference suppression control in wireless communication.

Description of the Related Art

In order to save power of a terminal apparatus in a wireless LAN, a technique of holding a terminal apparatus that need not transmit/receive a signal in a sleep state as much as possible has been examined. Japanese Patent Laid-Open No. 2006-025181 has described a technique of, when an access point searches for an idle timing of a managed wireless channel, and then establishes a wireless link with a terminal apparatus, notifying a wireless terminal of the idle timing.

Recently, the IEEE802.11ax standard that aims at using a wireless medium effectively is issued as a draft standard. In this standard, a procedure based on TWT (Target Wake Time) has been proposed in order to save power of a terminal apparatus. In this procedure, an access point designates time to activate the terminal apparatus (TWT), and the terminal apparatus is activated in accordance with the notified TWT and transmits/receives a signal while it is active. This allows the terminal apparatus to shift to a sleep state (Doze state) in a period until the TWT and reduce power consumption. Note that the IEEE802.11ax standard plans to make transmission of individual data signals from the access point to a plurality of terminal apparatuses at the same time or transmission of signals from the plurality of terminal apparatuses to one access point at the same time, that is, multiuser communication possible. Such multiuser communication can be performed by using, for example, OFDMA that performs multiplexing on a frequency axis or MU-MIMO that performs multiplexing on a spatial axis.

A terminal apparatus of the first type which is compliant with the IEEE802.11ax standard can interpret a signal that designates TWT transmitted from the access point and operate in accordance with the designated TWT. On the other hand, a terminal apparatus of the second type which is not compliant with the IEEE802.11ax standard cannot interpret the signal that designates the TWT transmitted from the access point. As a result, the terminal apparatus of the second type cannot recognize a timing at which the terminal apparatus of the first type is activated, and the transmitted signal may interfere with a control signal or a data signal when the terminal apparatus of the first type performs communication. At this time, for example, if an interference with a trigger signal for causing a plurality of terminal apparatuses of the first type to transmit predetermined signals at the same time occurs, the predetermined signals may not be transmitted. Then, as a result, for example, retransmission of the trigger signal may occur, making it impossible for the terminal apparatuses to shift to sleep states.

SUMMARY OF THE INVENTION

The present invention sets an appropriate communicable period in accordance with the characteristics of a terminal apparatus.

According to one aspect of the present invention, there is provided a communication apparatus comprising: a transceiver capable of communicating with a first other communication apparatus operable in accordance with information of a schedule for causing another communication apparatus to operate in a communicable state and a second other communication apparatus inoperable in accordance with the information of the schedule, the information being contained in a first radio signal transmitted by the communication apparatus; and a controller configured to, in a case where the first radio signal is transmitted, control, by the schedule, the transceiver so as to transmit a second radio signal for limiting transmission of a radio signal by the second other communication apparatus in at least a part of a period in which the first other communication apparatus is caused to operate in a communicable state.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a timing chart showing the outline of the sequence of system processing according to processing example 2;

FIG. 9 is a flowchart showing an example of the sequence of access point processing according to processing example 2;

FIG. 10 is a timing chart showing the outline of the sequence of system processing according to processing example 3.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(System Arrangement)

Figure 1:
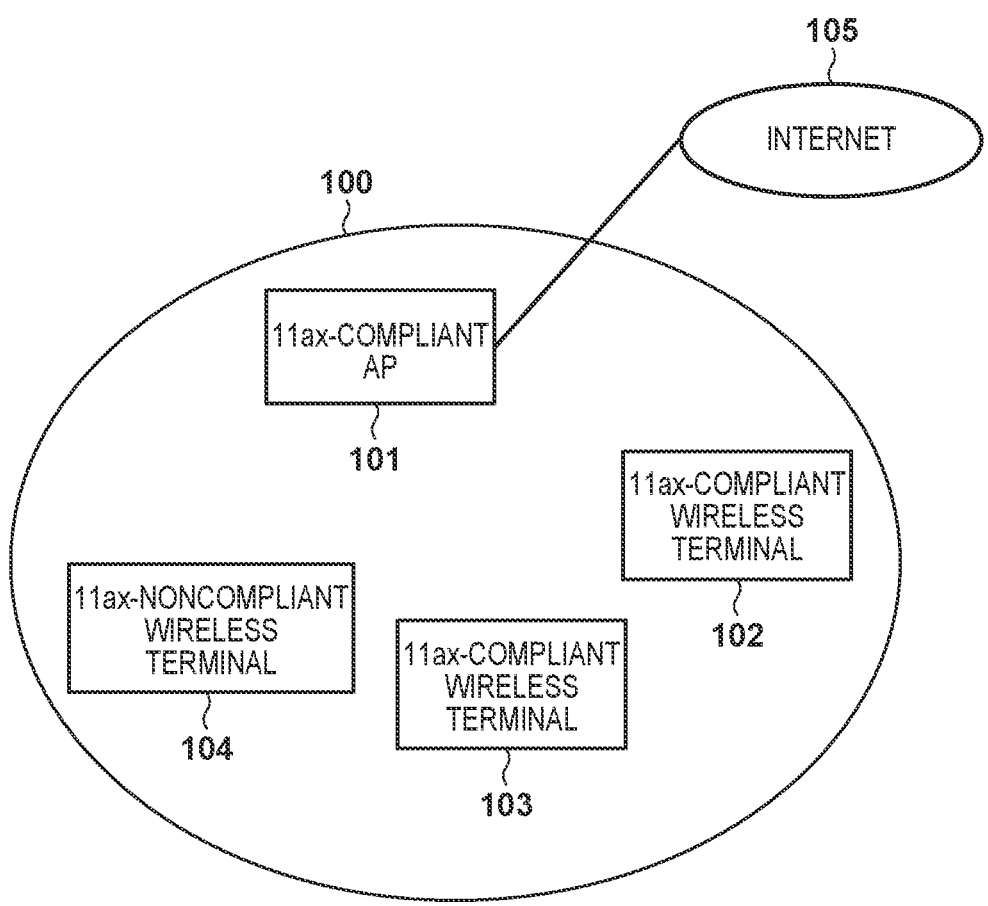
FIG. 1 is a block diagram showing an example of the arrangement of a wireless communication system.

FIG. 1 shows an example of a wireless communication system according to this embodiment. This wireless communication system includes an access point (AP) 101 and wireless terminals 102 to 104. Note that the AP 101 and the wireless terminals 102 to 104 are wireless communication apparatuses complying with one of the IEEE802.11 standards. However, the wireless terminal 104 does not comply with the IEEE802.11ax standard, and the other apparatuses comply with the IEEE802.11ax standard. Note that the AP 101 can be connected to the Internet 105 or the like by, for example, wired connection.

In this embodiment, the AP 101 can perform power-saving processing based on TWT (Target Wake Time) with the plurality of wireless terminals 102 and 103 operable in accordance with the IEEE802.11ax standard. This processing will be described later. Then, the AP 101 performs processing which is not interfered by the wireless terminal 104 that does not comply with the IEEE802.11ax standard on communication related to this processing based on this TWT. In an example, the AP 101 controls communication of the wireless terminal 104 such that the communication of the wireless terminal 104 is performed while the wireless terminals 102 and 103 are in sleep (Doze) states.

For this purpose, for example, the AP 101 sends a CTS (Clear To Send)-to-self frame so the wireless terminal 104 does not transmit a signal in a period during which communication with the wireless terminals 102 and 103 is performed. Note that a NAV (Network Allocation Vector) designated by the CTS-to-self frame is set to be in a period until at least the completion of a period in which multiuser communication between the wireless terminals 102 and 103 and the AP 101 is performed. Accordingly, the wireless terminal 104 does not transmit a signal in the period in which multiuser communication between the wireless terminals 102 and 103 and the AP 101 is performed, and transmits a signal after the wireless terminals 102 and 103 are set in the Doze states. This allows the AP 101 to reduce a probability that a signal from a wireless terminal which is not compliant with the IEEE802.11ax standard interferes with a signal according to the IEEE802.11ax standard.

The AP 101 can also control communication of the wireless terminal 104 by using the mechanism of PSMP (Power Save Multi Poll). The AP 101 can designate, by a PSMP frame, a period in which communication between an uplink and a downlink should be performed with the wireless terminal 104. The wireless terminal 104 can perform communication in a period designated by the PSMP frame and be set in the Doze state in the remaining period. The AP 101 can prevent a signal transmitted by the wireless terminal 104 from interfering with multiuser communication with the wireless terminals 102 and 103 by, for example, forming the PSMP frame so as to perform communication in a period different from the period in which the multiuser communication is performed.

Furthermore, the AP 101 can set a CFP (Contention Free Period) for controlling the right of access to the medium of each wireless terminal. The CFP is a period in which only a wireless terminal that has received polling from the AP 101 obtains the right to access to the medium. By using this, the AP 101 sets, as the CFP, the period different from the period in which multiuser communication is performed with the wireless terminals 102 and 103, and communicates with the wireless terminal 104. This allows the AP 101 to cause the wireless terminal 104 to communicate while the wireless terminals 102 and 103 are in the Doze states, and prevent the signal transmitted by the wireless terminal 104 from interfering with multiuser communication.

In the following description, the arrangement of the AP 101 that performs such processing will be described first, communication control based on TWT and communication control based on PMSP to be used in an explanation below will briefly be described next, and then an example of processing performed by the AP 101 will be described. Note that each of the wireless terminals 102 and 103 is a general wireless LAN terminal having a communication function complying with the IEEE802.11ax standard, and thus its arrangement will not be described in detail here. The wireless terminal 104 is also a general wireless LAN terminal having a communication function complying with, for example, one of the IEEE802.11 standards different from the IEEE802.11ax, and thus its arrangement will not be described in detail here. However, the wireless terminal 104 cannot interpret at least some control signals such as a trigger signal according to the IEEE802.11ax standard. Note that a wireless LAN terminal will sometimes be referred to as an "STA" hereinafter. A description will be given below assuming that the IEEE802.11ax standard is used. However, the present invention is not limited to this. That is, the same processing can be performed in a case in which the first terminal apparatus complying with a predetermined standard and the second terminal apparatus complying with a succeeding standard of the predetermined standard coexist, and the first terminal apparatus cannot interpret a control signal according to the succeeding standard. A predetermined function and signal will be described below by using technical terms regarding the IEEE802.11 standards. However, a technique according to this embodiment should be understood by replacing them with another function and signal having the same significance as the terms.

(Apparatus Arrangement)

Figure 2:
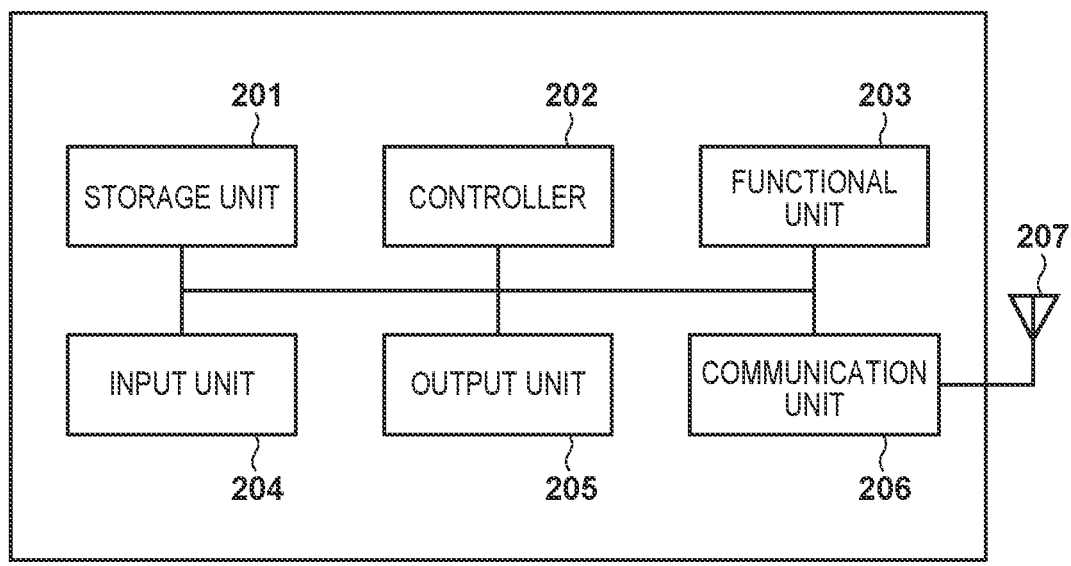
FIG. 2 is a block diagram showing an example of the hardware arrangement of an access point.

FIG. 2 is a block diagram showing an example of the hardware arrangement of the AP 101 according to this embodiment. The AP 101 includes, for example, a storage unit 201, a controller 202, a functional unit 203, an input unit 204, an output unit 205, a communication unit 206, and an antenna 207 as its hardware arrangement.

The storage unit 201 is formed by both a ROM and a RAM or one of them, and stores programs for performing various operations to be described later, and various kinds of information such as communication parameters for wireless communication. The ROM stands for a "Read Only Memory", and the RAM stands for a "Random Access Memory". Note that as the storage unit 201, it is also possible to use a storage medium such as a flexible disk, a hard disk, an optical disk, a magnetooptical disk, a CD-ROM, a CD-R, a magnetic tape, a nonvolatile memory card, or a DVD, instead of the memory such as a ROM or RAM. The storage unit 201 may also be formed by a plurality of memories or the like.

The controller 202 is formed by a CPU or a MPU, and controls the whole AP 101 by executing the programs stored in the storage unit 201. The CPU stands for a "Central Processing Unit", and the MPU stands for a "Micro Processing Unit". Note that the controller 202 may also control the whole AP 101 in cooperation with the programs and an OS stored in the storage unit 201. The OS stands for an "Operating System". Note also that the controller 202 may be formed by a plurality of processors such as multicores. As the controller 202, it is also possible to use an FPGA (Field Programmable Gate Array), a DSP (Digital Signal Processor), an ASIC (Application Specific Integrated Circuit), or the like. The controller 202 executes predetermined processes such as an access point function, image capturing, printing, and image projection by controlling the functional unit 203.

The functional unit 203 is hardware which allows the AP 101 to execute the predetermined processes. For example, if the AP 101 is a camera having an access point function, the functional unit 203 is an image capturing unit for performing an image capturing process. Alternatively, for example, if the AP 101 is a printer having an access point function, the functional unit 203 is a printing unit for performing print processing. Alternatively, for example, if the AP 101 is a projector having an access point function, the functional unit 203 is an image projection unit for performing image projection processing. Data to be processed by the functional unit 203 can be data stored in the storage unit 201, and can also be data obtained by communication performed with another apparatus via the communication unit 206 (to be described later).

The input unit 204 accepts various operations from a user. The output unit 205 performs various outputs to the user. The outputs by the output unit 205 herein mentioned include at least one of image display on the screen, sound output by a loudspeaker, vibration output, and the like. Note that it is also possible to implement the input unit 204 and the output unit 205 by one module such as a touch panel.

The communication unit 206 performs control of wireless communication complying with the IEEE802.11 series (such as the Wi-Fi standard), and control of IP communication. An IP stands for an "Internet Protocol". The communication unit 206 transmits and receives radio signals for wireless communication by controlling an antenna 207. The AP 101 can communicate contents such as image data, document data, and video data with a wireless terminal and can also relay communication between the wireless terminals connected to the AP 101 via the communication unit 206. Note that the communication unit 206 has, for example a wired communication function and can relay communication between a wireless terminal and a network such as the Internet by being connected to the network.

Figure 3:
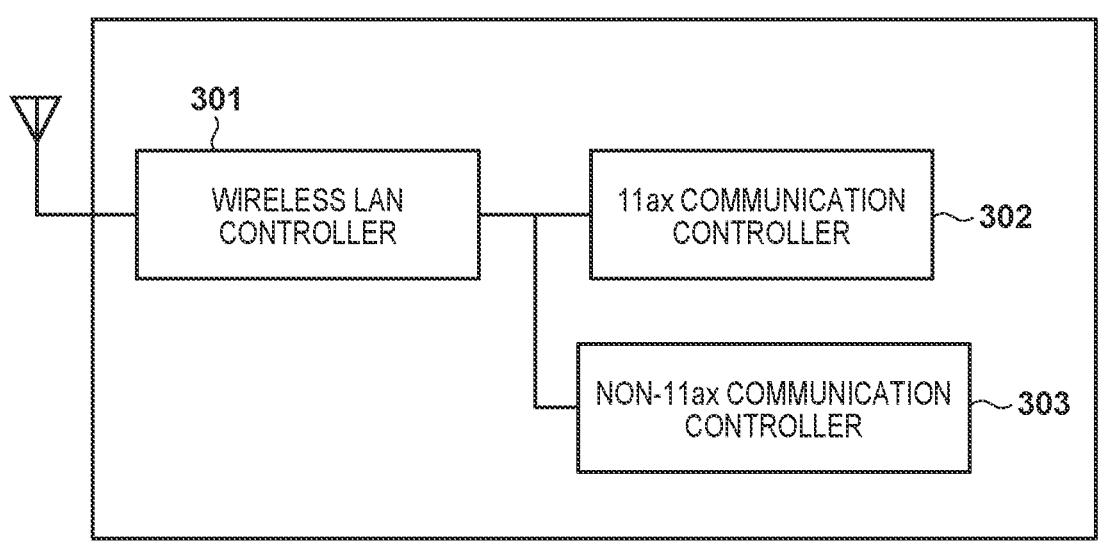
FIG. 3 is a block diagram showing an example of the functional arrangement of the access point.

FIG. 3 is a block diagram showing an example of the arrangement of the AP 101. The AP 101 includes, for example, a wireless LAN controller 301, an 11ax communication controller 302, and a non-11ax communication controller 303. Note that each function shown in FIG. 3 can be implemented by, for example, causing the controller 202 of FIG. 2 to execute the programs stored in the storage unit 201 but may be implemented by dedicated hardware such as a communication control chip.

The wireless LAN controller 301 controls whole communication processing when the AP 101 communicates with a wireless LAN terminal. When the wireless LAN terminal complies with the IEEE802.11ax standard, the 11ax communication controller 302 performs control such that the wireless LAN controller 301 performs communication by a procedure defined by the IEEE802.11ax standard. The non-11ax communication controller 303 controls communication by the wireless LAN controller 301 when the wireless LAN terminal does not comply with the IEEE802.11ax standard. For example, the non-11ax communication controller 303 performs communication control so the wireless LAN terminal noncompliant with the IEEE802.11ax does not interfere with the communication controlled by the 11ax communication controller 302. An example of each process to be described below is performed by, for example, the non-11ax communication controller 303.

(Communication Control Based on TWT)

Figure 4:
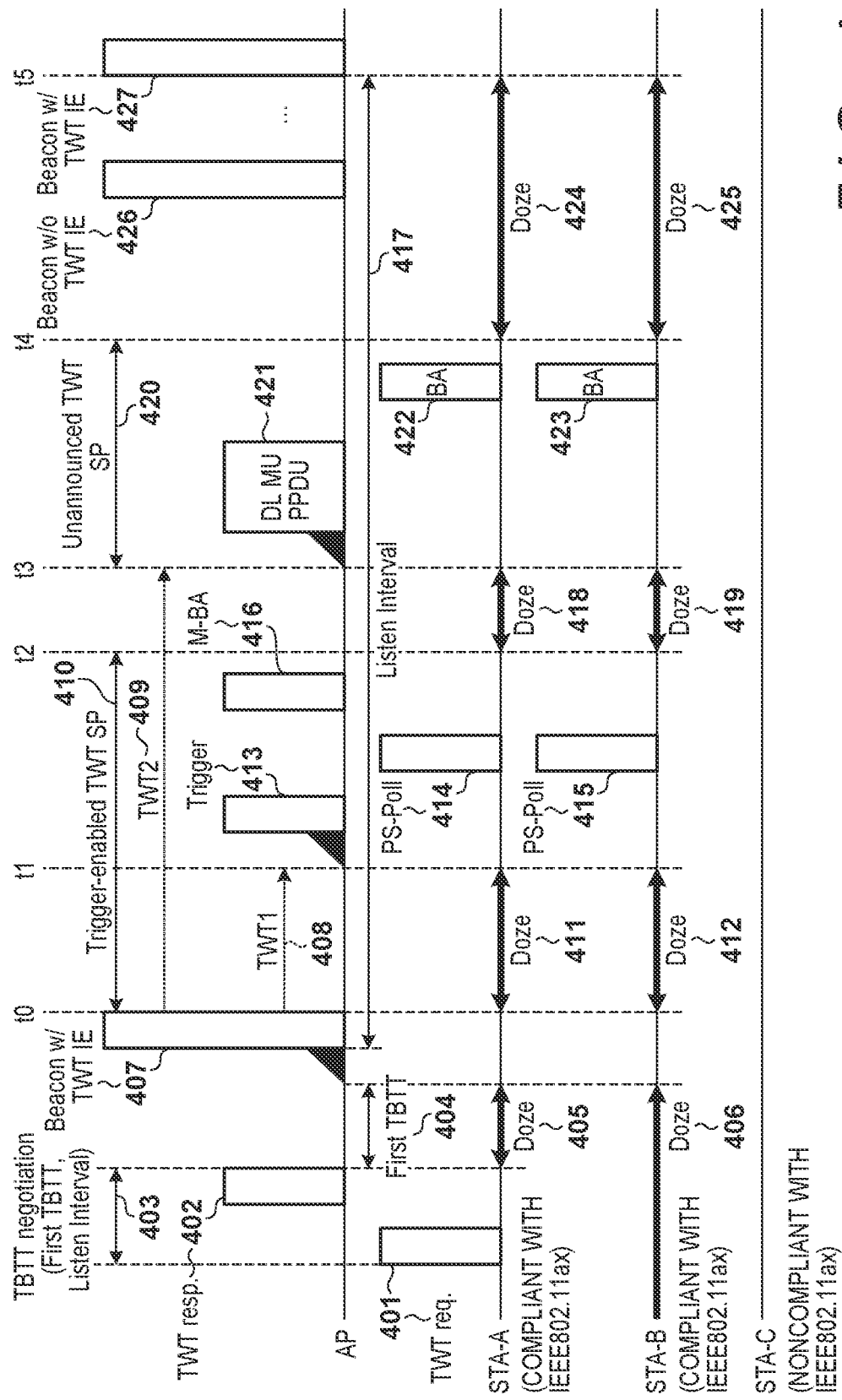
FIG. 4 is a timing chart showing the procedure of communication control based on TWT (Target Wake Time)

An example of the sequence of communication control based on TWT to be adopted by the IEEE802.11ax standard will now be described with reference to FIG. 4. Note that TWT can be set individually for each wireless terminal. However, an example in which common TWT is set for a plurality of wireless terminals will be described below.

First, a wireless terminal (STA-A) compliant with the IEEE802.11ax standard transmits a TWT request 401 (TWT req.) in order to request a power-saving schedule from an AP. Then, upon receiving the TWT request 401, the AP transmits a TWT response 402 (TWT resp.). Note that a period 403 from the TWT request 401 to the TWT response 402 is a section of a TBTT negotiation, and the First TBTT and a Listen Interval are determined in this section. Note that a TBTT stands for "Target Beacon Transmission Time". The First TBTT indicates an interval 404 from the TWT response 402 to the start of a preparation for transmission of a Beacon 407 (notification signal) with a TWT IE (Information Element). The Listen Interval indicates a transmission interval 417 of the Beacon with the TWT IE. Note that in FIG. 4, a Beacon 426 does not include the TWT IE, and a Beacon with the TWT IE transmitted after the Beacon 407 is a Beacon 427. In this case, a period from the end of transmission of the Beacon 407 to the start of transmission of the Beacon 427 is set for the Listen Interval, and the Beacon 426 is ignored in the setting of the Listen Interval. The wireless terminal identifies, by the First TBTT, the timing of, for example, a Beacon with a TWT IE transmitted first after receiving the TWT response. Then, the wireless terminal can further identify, in accordance with the Listen Interval, the transmission timing of a Beacon with a TWT IE transmitted periodically afterward.

Note that upon receiving the TWT response 402, the STA-A shifts to a Doze state 405 (can also be referred to as a Sleep state or a power-saving state) until a transmission preparation timing of a Beacon with the first TWT IE designated at the First TBTT. Note that for example, an STA-B transmits the TWT request to the AP before the process of FIG. 4 is started. Then, the STA-B stays in a Doze state 406 until the transmission timing of a Beacon including a next TWT IE that is identified based on the Listen Interval.

Each of the STA-A and the STA-B shifts from the Doze state to an active state capable of performing communication at a timing when transmission of the Beacon 407 with the TWT IE is prepared and waits for the Beacon 407. Let t0 be time at which transmission of the Beacon 407 is complete.

In the TWT IE of the Beacon 407, a TWT1 408 of a time interval immediately after transmission of the Beacon 407 to the transmission preparation of a Trigger frame 413 for the AP to accept polling is designated. Let t1 be end time of this TWT1 408. Upon receiving the Beacon 407, the STA-A and the STA-B shift to Doze states 411 and 412, and return to the active states in accordance with the end of the TWT1 408. Then, after the end of the TWT1 408, the AP transmits the Trigger frame 413 for causing the STA-A and the STA-B to transmit polling frames. Upon receiving this Trigger frame 413, the STA-A and the STA-B, respectively, transmit PS-Poll frames 414 and 415 as polling signals in the power-saving state. Note that the PS-Polls 414 and 415 are transmitted from the STA-A and the STA-B simultaneously by using the Trigger frame 413 as a trigger. Note that signals from a plurality of STAs can be multiplexed and transmitted in a frequency domain or a spatial domain by OFDMA (Orthogonal Frequency-Division Multiple Access) or UL MU-MIMO (UpLink MultiUser MIMO). Upon receiving the polling signals from the STA-A and the STA-B, the AP transmits a multistation-block ACK 416 (M-BA) in order to return an acknowledge to these signals simultaneously. Let t2 be transmission end time of this M-BA. Note that a period 410 from t0 to t2 is a communication enable period based on a trigger (Trigger-enabled TWT SP (Service Period)). The Trigger-enabled TWT SP is designated by, for example, the TWT IE of the Beacon 407, and the STA-A and the STA-B can maintain the active states until the expiration of this period after the TWT1.

In addition, in the TWT IE of the Beacon 407, a TWT2 409 of a time interval immediately after transmission of the Beacon 407 until the transmission preparation of a downlink multiuser packet (DL MU PPDU 421) is made is also designated. After receiving the M-BA 416, the STA-A and the STA-B shift to Doze states 418 and 419 again, and return to the active states at end time t3 of the TWT2 409. Upon completion of the transmission preparation of the DL MU PPDU 421, the AP transmits packets to the STA-A and the STA-B. Upon succeeding in receiving this DL MU PPDU 421, the STA-A and the STA-B transmit block ACK (BA) to the AP. The block ACK can be multiplexed in a frequency domain or a spatial domain, but its contents are the same as block ACK used in a conventional wireless LAN, and thus a description thereof will be omitted. Note that a period 420 in which this DL MU PPDU 421 is transmitted, and BAs 422 and 423 are transmitted is a period unannounced by the TWT IE of the Beacon 407 and is referred to as an Unannounced TWT SP. Note that let t4 be end time of the period 420. After the end of the period 420, the STA-A and the STA-B shift to Doze states 424 and 425 until the transmission timing (or a preparation start timing of the transmission) of the Beacon 427 with the next TWT IE.

As described above, the plurality of wireless terminals compliant with the IEEE802.11ax can achieve power saving by conducting a negotiation regarding a TWT with the AP and efficient simultaneous signal transmission in an uplink direction by Trigger.

Note that a terminal which is not compliant with the IEEE802.11ax standard cannot grasp duration times of these Trigger frame 413, PS-Polls 414 and 415, and M-BA 416 from information elements of these frames. Thus, an STA-C noncompliant with the IEEE802.11ax may be added to such a network and transmit a signal that interferes with a Trigger frame.

In order to prevent occurrence of such an interference, the AP communicates with the wireless terminal (STA-C) which is not compliant with the IEEE802.11ax while the wireless terminals (STA-A and STA-B) operating in accordance with the IEEE802.11ax standard are in the Doze states. For this purpose, the AP transmits a predetermined signal so the wireless terminal which is not compliant with the IEEE802.11ax does not transmit a signal while the wireless terminals operating in accordance with the IEEE802.11ax standard are not in the Doze states. Such a process will be described below by using some examples.

<Processing Example 1>

Figure 5:
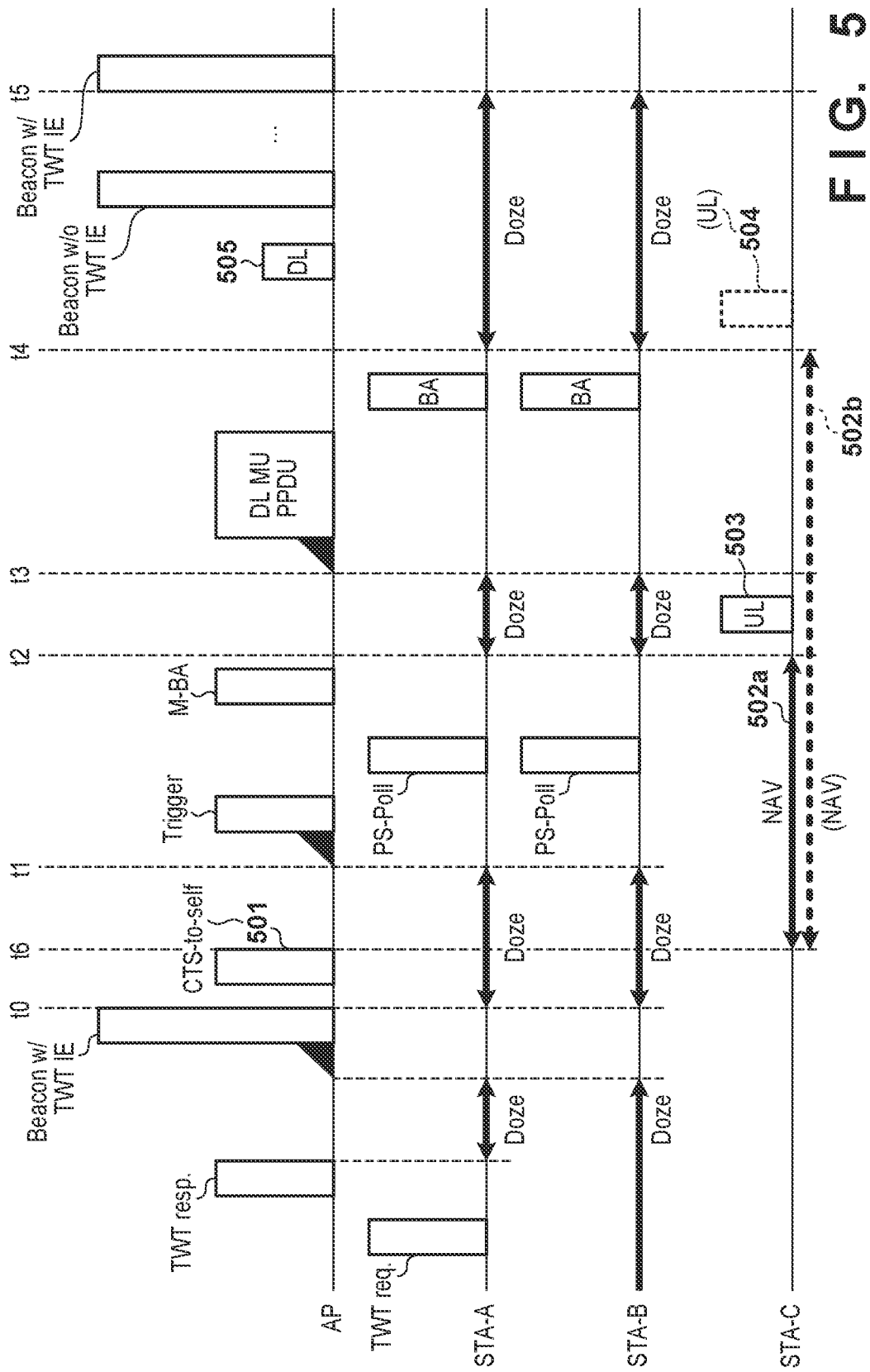
FIG. 5 is a timing chart showing the outline of the sequence of system processing according to processing example 1.

In this processing example, the AP uses CTS-to-self to cause the wireless terminal (STA-C) which is not compliant with the IEEE802.11ax to set a transmission prohibition period (NAV) and prevent occurrence of an interference with communication of the wireless terminals operating in accordance with the IEEE802.11ax standard. This processing will be described with reference to FIG. 5. Note that FIG. 5 is the same as FIG. 4 except that reference numerals are given.

Note that regarding communication from the AP to the STA-C, the AP recognizes the period in which the STA-A and the STA-B are in the Doze states, and thus can transmit a signal in that period. Note that if the STA-C receives a radio signal from the AP, it can transmit a response (ACK) to it. Therefore, for example, if the length of a period from the time t0 to the time t1 in which the STA-A and the STA-B are in the Doze states is a sufficient length for performing transmission of a downlink signal and response reception, the AP can determine to transmit the downlink signal. Note that the AP may determine or transmit the downlink signal as described above in accordance with, for example, accumulation of data to be transmitted to the STA-C in a buffer. Note that FIG. 5 shows an example in which the AP transmits a downlink signal 505 to the STA-C in a period from time t4 to time t5 out of the period in which the STA-A and the STA-B are in the Doze states. Note that the time t5 indicates transmission start time of the Beacon 427 with the next TWT IE.

In order to prevent the STA-C from transmitting an uplink signal during communication with the STA-A and the STA-B, the AP transmits CTS-to-self 501 and stops signal transmission by a wireless terminal which exists on the periphery and does not operate based on TWT. Note that let t6 be transmission end time of this CTS-to-self 501. At this time, because the STA-A and the STA-B shift to the Doze states at the time t2, the AP can set the length of a transmission prohibition section as t2-t6 so as to set a period until the time t2 to be a NAV period 502a. Because the STA-A and the STA-B shift to the Doze states at the time t4, the AP can set the length of a transmission prohibition section as t4-t6 so as to set a period until the time t4 to be a NAV period 502b. Note that the AP can determine the times t1 to t5 when transmitting the Beacon 407 with the TWT IE, and thus can determine t2-t6 and t4-t6 of the lengths of the transmission prohibition sections appropriately. When the NAV period 502a is set, the STA-C transmits an uplink signal 503 to the AP in a period from the time t2 to the time t3 in which the STA-A and the STA-B are in the Doze states. On the other hand, when the NAV period 502b is set, the STA-C transmits an uplink signal 504 to the AP in a period from the time t4 to the time t5 in which the STA-A and the STA-B are in the Doze states. Note that upon receiving these uplink signals, the AP transmits a response signal (ACK) to the STA-C.

Note that the STA-A and the STA-B shift to the Doze states in the period of TWT1 (from the time t0 to the time t1), and thus do not update the NAV by CTS-to-self. Even if CTS-to-self is received, the STA-A and the STA-B can perform the subsequent transmission operation of an uplink signal by receiving the Trigger frame 413.

Figure 6:
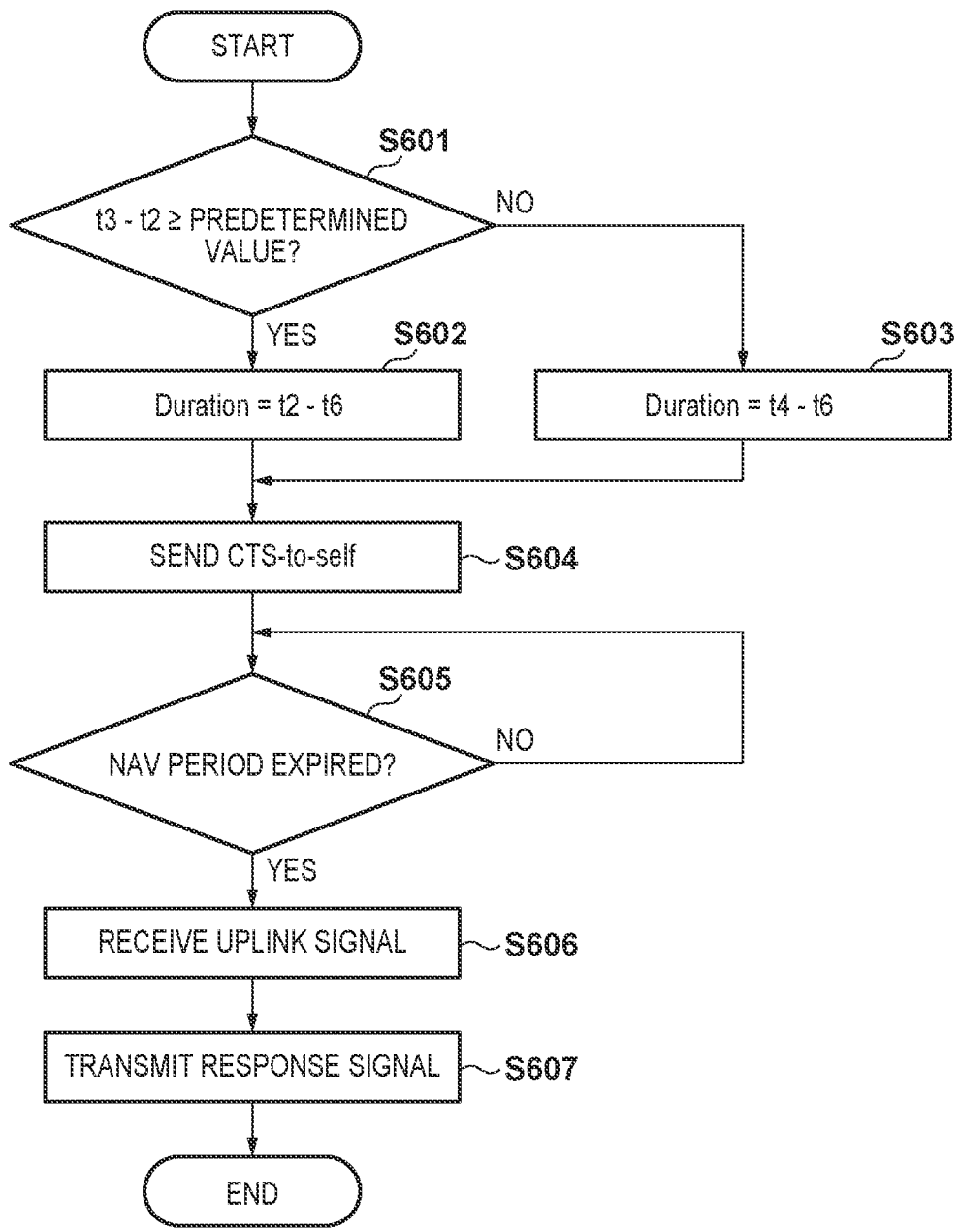
FIG. 6 is a flowchart showing an example of the sequence of access point processing according to processing example 1.

FIG. 6 shows a process performed by the AP concerning the uplink of the STA-C. Note that FIG. 6 omits matters other than the communication of the STA-C such as communication with the STA-A and the STA-B for the sake of descriptive simplicity. The AP can transmit a downlink signal while the STA-A and the STA-B are in the Doze states, as described above.

In this process, the AP first determines whether the length of a period between the time t2 and the time t3 in which the STA-A and the STA-B shift to the Doze states is sufficient to perform uplink communication from the times t1 to t5 determined when the Beacon 407 with the TWT IE is generated. That is, the AP determines whether t3-t2 is equal to or larger than a predetermined value which is the sum of one transmission right time (TXOP) of the STA-C and a time required to transmit a response signal (ACK) to it in uplink communication (step S601). Note that this determination can be made, for example, when the Beacon 407 is generated or after the Beacon 407 is transmitted. Alternatively, the AP, for example, may first determine whether data to be transmitted to the STA-C in a downlink exists, transmit such data if the data exists, and then make the above-described determination. Alternatively, if such data exists, the AP may transmit such data when it can complete transmission of downlink data, reception of a response to it, and transmission of CTS-to-self to be described later between the time t0 and the time t1.

If the AP determines that t3-t2 is equal to or larger than the above-described predetermined value (YES in step S601), it determines that the period from the time t2 to the time t3 is sufficient for the STA-C to transmit data and determines that the STA-C sets a period until the time t2 as a NAV period. In this case, the AP sets a Duration to be included in CTS-to-self to t2-t6 by using t6 of the transmission completion time of CTS-to-self (step S602). Then, the AP sends CTS-to-self that has designated this Duration (step S604). Upon receiving this CTS-to-self, the STA-C sets the NAV period of the length of t2-t6 and does not transmit a signal until the elapsation of this period. As a result, the STA-C transmits an uplink signal after the time t2 at which the NAV period expires (YES in step S605). Upon receiving this uplink signal (step S606), the AP transmits a response signal (step S607) and terminates the process. On the other hand, if the AP determines that t3-t2 is smaller than the above-described predetermined value (NO in step S601), it determines that the period from the time t2 to the time t3 is insufficient to transmit the data and determines that the STA-C sets a period until the time t4 as a NAV period. That is, the AP determines to grant a data transmission right to the STA-C in the period from the time t4 to the time t5 capable of ensuring a relatively long period for communication after the completion of transmission of the DL MU PPDU 421. In this case, the AP sets a Duration to be included in CTS-to-self to t4-t6 (step S603). The subsequent processes are the same as in steps S604 to S607 as described above. Consequently, the STA-C sets a NAV period of the length of t4-t6 upon receiving this CTS-to-self, does not transmit a signal until the elapsation of the period, and transmits an uplink signal after the time t4.

Note that, for example, in the period from the time t4 to the time t5, if downlink data to be transmitted to the STA-C exists, the AP can also transmit the data and receive a response to it. The AP can perform transmission of this downlink data or the like, for example, after reception of an uplink signal from the STA-C and transmission of a response to it.

As described above, in this processing example, CTS-to-self that can be interpreted by any wireless terminal complying with one of the IEEE802.11 standard series is used to control communication. This makes it possible to prevent a wireless terminal incapable of interpreting a signal of a new standard such as the IEEE802.11ax from interfering with communication in the new standard.

<Processing Example 2>

In this processing example, the AP uses PSMP (Power Save Multi Poll) to control a timing at which the wireless terminal (STA-C) which is not compliant with the IEEE802.11ax performs communication.

Figure 7A:
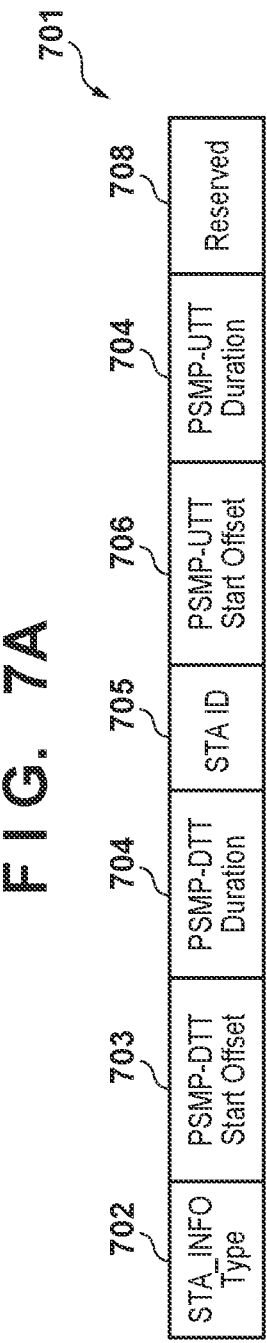
FIG. 7A is a view showing an example of a PSMP (Power Save Multi-Poll) frame.
Figure 7B:
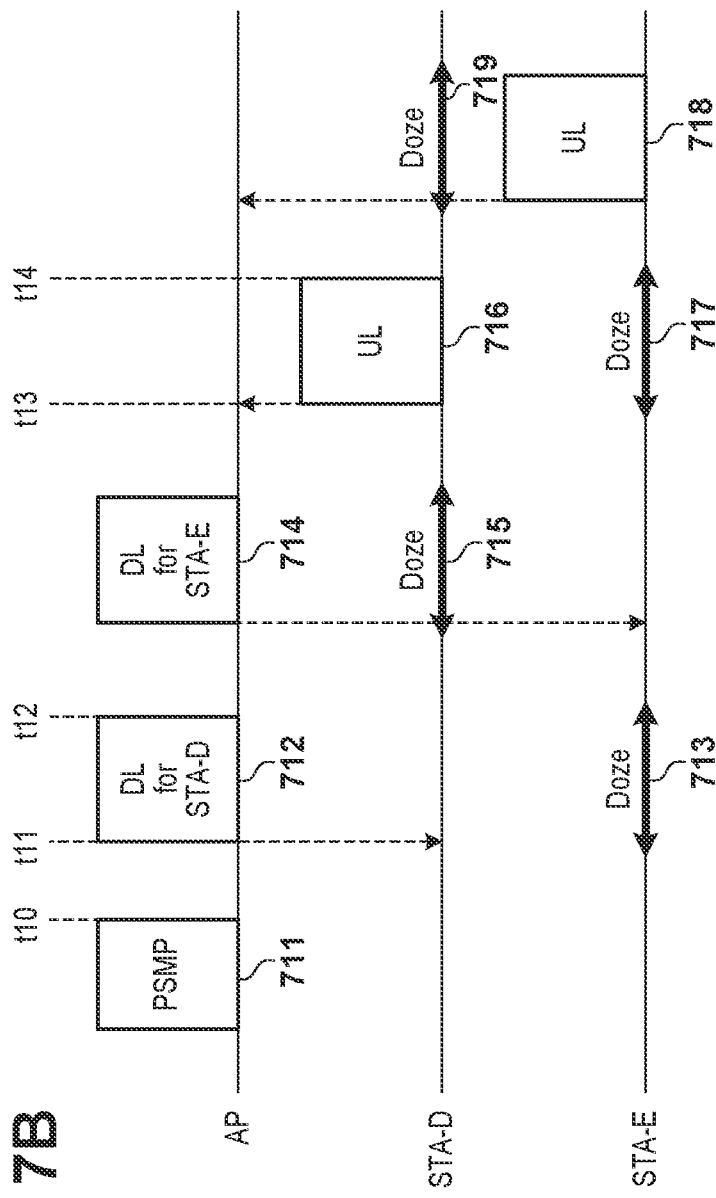
FIG. 7B is a timing chart showing the procedure of communication control based on PSMP (Power Save Multi-Poll)

First, the procedure of the PSMP will be described with reference to FIGS. 7A and 7B. In the PSMP, the AP transmits a PSMP frame for defining communication periods of an uplink and a downlink. FIG. 7A shows an example of a PSMP frame 701. FIG. 7B shows an example of the sequence of communication control using the PSMP frame.

In the PSMP frame 701, an STA_INFO Type 702 is a field indicating the application of this PSMP frame 701, that is, whether it is for broadcast or multicast, or it is addressed to an individual wireless terminal. For example, "0" if the PSMP frame 701 is for broadcast, "1" if the PSMP frame 701 is for multicast, and "2" if the PSMP frame 701 is addressed to the wireless terminal individually are stored in the STA_INFO Type 702. Here, the PSMP frame 701 is addressed to the wireless terminal individually, and thus a value "2" is stored in the STA_INFO Type 702.

Each of a PSMP-DTT Start Offset 703 and a PSMP-DTT Duration 704 is information indicating a period set for downlink signal transmission. A value indicating an offset value from time at which transmission of the PSMP frame 701 is complete to time at which downlink transmission is started is stored in the PSMP-DTT Start Offset 703. That is, the wireless terminal can determine that reception of a downlink signal is started at time when an offset period indicated by the PSMP-DTT Start Offset 703 has elapsed after reception of the PSMP frame 701. A value indicating the length of a period in which downlink communication continues from time identified by the PSMP-DTT Start Offset 703 is stored in the PSMP-DTT Duration 704. An example in a case in which downlink transmission addressed to an STA-D is performed in a period from time t11 to time t12 as shown in FIG. 7B will be described here. Note that reference numeral t10 denotes completion time of a PDMP frame here. In this case, a value "t11-t10" is stored in the PSMP-DTT Start Offset 703 of a time offset until the start of downlink transmission. On the other hand, a value "t12-t11" is stored in the PSMP-DTT Duration 704 of a time length from the start to end of downlink transmission.

Each of a PSMP-UTT Start Offset 706 and a PMSP-UTT Duration 707 is information indicating a period set for uplink signal transmission. These values are set in the same manner as the PSMP-DTT Start Offset 703 and the PSMP-DTT Duration 704. That is, a value indicating an offset value from time at which transmission of the PSMP frame 701 is complete to time at which uplink transmission is started is stored in the PSMP-UTT Start Offset 706. A value indicating the length of a period in which uplink communication continues from time identified by the PSMP-UTT Start Offset 706 is stored in the PMSP-UTT Duration 707. Therefore, as shown in FIG. 7B, when uplink transmission from the STA-D is performed in a period from time t13 to time t14, a value "t13-t10" is stored in the PSMP-UTT Start Offset 706. A value "t14-t13" is stored in the PMSP-UTT Duration 707.

An STA ID 705 stores an AID (Association IDentifier) for identifying a wireless terminal of the destination of this PSMP frame 701. Reserved 708 is a reservation field.

In FIG. 7B, first, the AP 101 transmits a PSMP frame 711 that defines each field as described above to each STA. Note that here, with respect to the STA-D, the AP assigns the period from the time t11 to the time t12 to downlink transmission and assigns the period from the time t13 to the time t14 to uplink transmission, as described above. With respect to an STA-E, the AP sets the value of each field so as to assign a period that does not overlap these periods to downlink transmission and uplink transmission, and transmits the PSMP frame 711.

The AP transmits a downlink signal 712 for the STA-D in an STA-D downlink period (from the time t11 to the time t12) designated by the PSMP frame 711. At this time, the STA-E is set in a Doze state 713 because the period is not a communication period assigned to itself. Subsequently, the AP transmits a downlink signal for the STA-E 714 in an STA-E downlink period designated by the PSMP frame 711. In this period, the STA-D is set in a Doze state 715 because the period is not a communication period assigned to itself.

Subsequently, the STA-D transmits an uplink signal 716 for the AP in an STA-D uplink period (from the time t13 to the time t14) designated by the PSMP frame 711. Note that in this period, the STA-E is set in a Doze state 717 because the period is not a communication period assigned to itself. Subsequently, the STA-E transmits an uplink signal 718 for the AP in an STA-E uplink period designated by the PSMP frame 711. Note that in this period, the STA-D is set in a Doze state 719 because the period is not a communication period assigned to itself.

Note that the STA-D can be set in a Doze state, for example, only in a period for uplink transmission or downlink transmission assigned to the STA-E. Similarly, the STA-E can be set in a Doze state only in a period for uplink transmission or downlink transmission assigned to the STA-D.

The sequence of a process according to this processing example will now be described with reference to FIG. 8. In this processing example, the AP identifies a communication period with the STA-C by using a PSMP frame. Note that FIG. 8 is the same as FIG. 4 except that reference numerals are given. The AP determines a period in which downlink and uplink communications are performed with the STA-C, generates a PSMP frame 801 for designating the period, and transmits it to the STA-C. Note that in FIG. 8, the PSMP frame 801 is transmitted before the Beacon 407 with the TWT IE, but the present invention is not limited to this. Here, the AP recognizes the times t1 to t5 designated by the TWT IE and the time t0 at which transmission of the Beacon 407 is complete if the PSMP frame 801 is transmitted before the Beacon 407. The AP can select, for example, one of (a) a period from the time t0 to the time t1, (b) a period from the time t2 to the time t3, and (c) a period from the time t4 to the time t5 in which the STA-A and the STA-B are in the Doze states as a period for communication with the STA-C. The AP selects, for example, a period longer than a time length required for transmission of a downlink signal to the STA-C and reception of a response, and reception of an uplink signal from the STA-C and transmission of a response from the above-described periods (a) to (c). Then, in accordance with the selected period, the AP sets one of a setting a to a setting c and sets each field of the PSMP frame 801. In FIG. 8, settings corresponding to these periods (a) to (c) are represented as the settings a to c. In accordance with this setting, the STA-C receives a downlink signal, transmits a response to it, transmits an uplink signal, and receives a response to it. For example, if the STA-C receives the PSMP frame 801 that designates the setting a from the AP, it receives a downlink signal 802a from the AP and transmits an uplink signal 803a to the AP 101. Similarly, if the STA-C receives the PSMP frame 801 that designates the setting b (setting c) from the AP, it receives a downlink signal 802b (signal 802c) from the AP and transmits an uplink signal 803b (signal 803c) to the AP. Note that the AP may generate, for example, a PSMP frame indicating that a period in which the STA-A and the STA-B perform multiuser communication is assigned to communication to a wireless terminal other than the STA-C, and transmit the PSMP frame to the STA-C. In this case, the STA-C can recognize that a period in which the STA-A and the STA-B perform communication is not a period assigned to itself, and thus can shift to a Doze state. As a result, the STA-C does not transmit a signal in the period in which the STA-A and the STA-B perform communication, making it possible to prevent an interference with a signal regarding the IEEE802.11ax.

A process performed by the AP will now be described with reference to FIG. 9. First, based on the length of a period in which the STA-A and the STA-B stay in the Doze states, and the length of a period required for communication with the STA-C, the AP sets a period in which communication with the STA-C is performed (step S901). Note that here, the AP selects a setting to be applied, for example, among the setting a to the setting c of FIG. 8 and determines the setting. Subsequently, based on the determined setting and the transmission end timing (time t7 in FIG. 8) of the PSMP frame, the AP stores a value in each field in the PSMP frame and transmits it to the STA-C (step S902). Upon reaching the start time of the set period (step S903), the AP then performs data communication in a downlink (steps S904 and S905) and data communication in an uplink (steps S906 and S907) in the set period.

In this processing example, by using the PSMP, it becomes possible to prevent the signal transmitted from the STA-C from interfering with a signal (for example, the Trigger frame 413) regarding communication between the AP, and the STA-A and the STA-B. For example, when the AP is connected to a plurality of wireless terminals which are not compliant with the IEEE802.11ax standard, it can finely control periods of communication in the downlink and communication in the uplink with respect to these wireless terminals by using a PSMP frame. Note that the AP can confirm whether the STA-C supports the PSMP by exchanging capability information at the time of connection with the STA-C. This allows the AP to use a method of this processing example only if the STA-C supports the PSMP. Note that if the STA-C does not support the PSMP, the AP can communicate with the STA-C by using, for example, a method in processing example 1 or a method of processing example 3 to be described later. That is, in accordance with the capability information of the STA-C, the AP can change the type of signal to be transmitted to set a communicable period of the STA-C appropriately.

<Processing Example 3>

In this processing example, the AP uses a CFP (Contention Free Period) to prevent a signal from the wireless terminal (STA-C) noncompliant with the IEEE802.11ax from interfering with communication of a wireless terminal which operates in accordance with the IEEE802.11ax standard. The CFP is a method for controlling medium access by a wireless terminal being connected to a control station (in this case, the AP). The AP transmits a polling frame (a CF-Poll or a QoS CF-Poll) to a wireless terminal that grants an access right to a wireless medium during the CFP. In a CFP period, the wireless terminal can acquire the access right to the wireless medium only when the polling frame is received and perform signal transmission to the AP. When the CFP is used, the AP can store a value indicating that the CFP is set and a value indicating the duration time of the CFP, for example, in the Beacon 407 or a search response signal to a search request signal when each wireless terminal searches for the AP and transmit these values. Note that the AP transmits signals while containing these pieces of information in the Beacon 407 below. Upon receiving these signals, the wireless terminal can obtain the duration time of the CFP stored in the signals, set the period as a NAV period, and monitor a polling frame. This processing will be described with reference to FIG. 10. Note that FIG. 10 is the same as FIG. 4 except that reference numerals are given.

FIG. 10 determines the length of the CFP, for example, before transmission of the Beacon 407. For example, the AP determines whether it is possible to complete communication of the STA-C in the period from the time t0 to the time t1 or the period from the time t2 to the time t3. Then, for example, if the AP determines that it is possible to complete communication of the STA-C in the period from the time t0 to the time t1, it determines to perform communication of the STA-C in that period. Similarly, for example, if the AP determines that it is possible to complete communication of the STA-C in the period from the time t2 to the time t3, it determines to perform communication of the STA-C in that period. Then, if the AP determines to perform communication of the STA-C in the period from the time t0 to the time t1, it determines, for example, the CFP as the period from the time t0 to the time t2. On the other hand, if the AP determines to perform communication of the STA-C in the period from the time t2 to the time t3, it determines, for example, the CFP as a period from the time t0 to the time t4. Then, the AP transmits a polling frame 1002a or 1002b to the STA-C in a period in which communication with the STA-C is to be performed, and the STA-C responds to this polling frame and transmits an uplink signal 1003a or 1003b to the AP. Note that the AP may determine, for example, the CFP as the period from the time t0 to the time t4 regardless of whether communication of the STA-C is performed in one of the period from the time t0 to the time t1 and the period from the time t2 to the time t3. According to this, it is possible to cause the STA-C not to transmit a signal in, for example, a period from the time t1 to the time t2 or the period from the time t3 to the time t4. Note that FIG. 10 shows an example in which the STA-C transmits the uplink signal during the CFP. However, the AP may transmit a downlink signal during this period. Alternatively, the AP may transmit the downlink signal in the period from the time t4 to the time t5.

Figure 11:
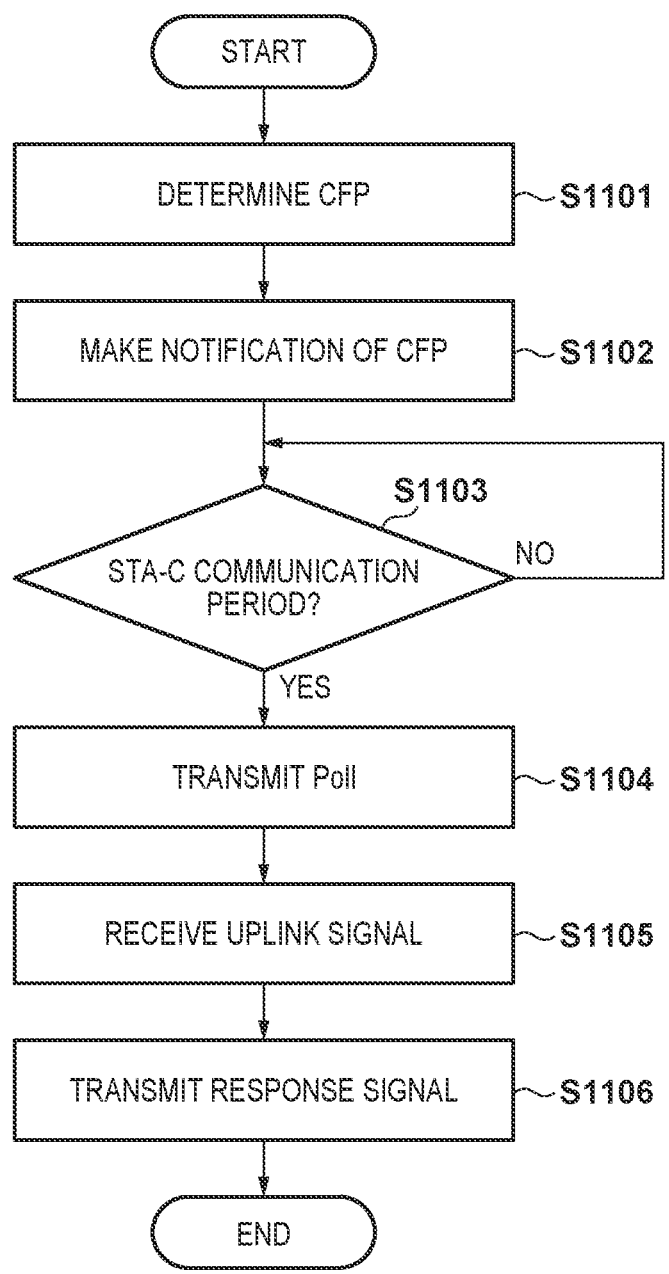
FIG. 11 is a flowchart showing an example of the sequence of access point processing according to processing example 3.

The sequence of a process by the AP in this processing example will now be described with reference to FIG. 11. First, the AP determines the CFP (step S1101). For example, based on whether the STA-C is caused to transmit the uplink signal in one of the period from the time t0 to the time t1 and the period from the time t2 to the time t3, the AP can determine one of the period until the time t2 and the period until the time t4 as the CFP. Note that, for example, the AP may determine the period until the time t4 as the CFP regardless of a timing at which the STA-C should perform communication. In this case, the AP can determine the CFP in accordance with the determination of the time t4 made when the TWT IE is set. Subsequently, the AP notifies the STA-C (and surrounding wireless terminals) of the CFP (step S1102) by, for example, the Beacon 407. Subsequently, in accordance with a shift to a period in which the STA-C should communicate (YES in step S1103), the AP transmits a polling frame to the STA-C (step S1104) and receives an uplink signal from the STA-C (step S1105). Then, the AP transmits an acknowledge to the uplink signal (step S1106) and terminates the process.

Thus, in this processing example, the AP can control the communication period of the STA-C by using the pulling frame. This makes it possible to prevent the signal transmitted from the STA-C from interfering with the signal (for example, the Trigger frame 413) regarding communication between the AP, and the STA-A and the STA-B. Note that the AP can confirm whether the STA-C supports polling (CF-Poll or QoS CF-Poll) by exchanging capability information at the time of connection with the STA-C. This allows the AP to use a method in this processing example only if the STA-C supports polling. Note that if the STA-C does not support polling, the AP can communicate with the STA-C by using, for example, the method in processing example 1, the method in processing example 2, or the like. That is, in accordance with the capability information of the STA-C, the AP can change the type of signal to be transmitted to set the communicable period of the STA-C appropriately.

As described above, the AP communicates with the first wireless terminal capable of shifting to the sleep state in accordance with a schedule by, for example, the TWT of the IEEE802.11ax and the second wireless terminal incapable of operating in accordance with the schedule while adjusting a communication period. The AP transmits, to the second wireless terminal, a predetermined signal for causing the second wireless terminal not to perform communication in the first period in which the first wireless terminal is not in the sleep state or for causing the second wireless terminal to perform communication in the second period in which the first wireless terminal is in the sleep state. This predetermined signal can be, for example, a CTS-to-self frame configured to set the first period to a NAV period or a PSMP frame that determines the second period as a communication period. Alternatively, the predetermined signal may be a combination of a signal such as a Beacon indicating that a period including the first period is set as the CFP and a polling frame transmitted to the second wireless terminal in the second period during the CFP. This allows the second wireless terminal to perform communication in the first period, making it possible to prevent an interference with communication between the first wireless terminal and the AP. Note that a plurality of first wireless terminals may exist, and the first period (including, for example, transmission of a control signal from the AP) can be a period in which multiuser communication in an uplink is to be performed. In this case, with the above-described method, it becomes possible to reduce the probability of occurrence of an interference that may influence a plurality of wireless terminals at once.

According to the present invention, it is possible to set an appropriate communicable period in accordance with the characteristics of a terminal apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-085613, filed Apr. 24, 2017, which is hereby incorporated by reference herein in its entirety.

What is claimed is:

1. A communication apparatus functioning as an access point comprising:
one or more memories having instructions stored therein; and
one or more processors that, upon execution of the instructions, is configured to:
perform, with a first other communication apparatus that can operate in accordance with first information that is related to Target Wake Time (TWT) and that is schedule information for putting another communication apparatus into a communicable state, communication based on the first information, wherein the first other communication apparatus is included in a network formed by the communication apparatus; and
set, in a case where a second other communication apparatus that cannot operate in accordance with the first information is included in the network formed by the communication apparatus, a Network Allocation Vector (NAV) for the second other communication apparatus,
wherein the NAV is set for the second other communication apparatus while the first other communication apparatus is in a Doze state.

2. The apparatus according to claim 1, wherein the first information is a TWT IE, Information Element.

3. The apparatus according to claim 1, wherein the one or more processors is, upon execution of the instructions, further configured to transmit a CTS, Clear To Send, to self frame for setting the NAV for the second other communication apparatus.

4. The apparatus according to claim 1, wherein the communication apparatus complies with an IEEE802.11 standard series.

5. The apparatus according to claim 1, wherein the first information contains information of a timing to transit to the communicable state.

6. The apparatus according to claim 1, wherein the communicable state is an Awake state in an IEEE802.11 standard series.

7. The apparatus according to claim 1, wherein the first other communication apparatus complies with the IEEE802.11ax standard.

8. The apparatus according to claim 1, wherein the NAV is set for the second other communication apparatus under a condition that the second other communication apparatus that cannot operate in accordance with the first information is included in the network formed by the communication apparatus.

9. The apparatus according to claim 1, wherein the one or more processors is, upon execution of the instructions, further configured to:
receive a TWT request from the first other communication apparatus;
transmit a TWT response to the first other communication apparatus, the TWT response including information indicating listen interval; and
transmit a plurality of beacons;
wherein the plurality of beacons include a first type of beacon that is periodically transmitted based on the listen interval and that contains a TWT IE, Information Element, and a second type of beacon that is not periodically transmitted based on the listen interval and that does not contain the TWT IE.

10. The apparatus according to claim 1, wherein the one or more processors is, upon execution of the instructions, further configured to:
in a case where the network formed by the communication apparatus includes an apparatus that can operate in accordance with the first information and an apparatus that cannot operate in accordance with the first information,
transmit a beacon including the TWT IE, and
transmit information for setting a NAV for another apparatus included in the network.

11. The apparatus according to claim 1, wherein the one or more processors is, upon execution of the instructions, further configured to:
transmit a beacon including the TWT IE; and
determine a duration of a NAV based on scheduling information defined by the TWT IE,
wherein the NAV with the determined duration is set for the second other communication apparatus.

12. A method for controlling a communication apparatus functioning as an access point, the method comprising:
performing, with a first other communication apparatus that can operate in accordance with first information that is related to Target Wake Time (TWT) and that is schedule information for putting another communication apparatus into a communicable state, communication based on the first information, wherein the first other communication apparatus is included in a network formed by the communication apparatus; and
setting, in a case where a second other communication apparatus that cannot operate in accordance with the first information is included in the network formed by the communication apparatus, a Network Allocation Vector (NAV) for the second other communication apparatus,
wherein the NAV is set for the second other communication apparatus while the first other communication apparatus is in a Doze state.

13. A communication apparatus functioning as an access point comprising:
one or more memories having instructions stored therein; and
one or more processors that, upon execution of the instructions, is configured to:
receive a TWT request from a first other communication apparatus;
transmit a TWT response to the first other communication apparatus, the TWT response including information indicating listen interval; and
transmit a plurality of beacons, wherein the plurality of beacons include a first type of beacon that is periodically transmitted based on the listen interval and that contains a TWT IE, Information Element, and a second type of beacon that is not periodically transmitted based on the listen interval and that does not contain the TWT IE;

perform, with the first other communication apparatus that can operate in accordance with first information that is related to Target Wake Time (TWT) and that is schedule information for putting another communication apparatus into a communicable state, communication based on the first information, wherein the first other communication apparatus is included in a network formed by the communication apparatus; and set, in a case where a second other communication apparatus that cannot operate in accordance with the first information is included in the network formed by the communication apparatus, a Network Allocation Vector (NAV) for the second other communication apparatus.

14. The apparatus according to claim 13, wherein the first information is a TWT IE, Information Element.

15. The apparatus according to claim 13, wherein the one or more processors is, upon execution of the instructions, further configured to transmit a CTS, Clear To Send, to self frame for setting the NAV for the second other communication apparatus.

16. The apparatus according to claim 13, wherein the communication apparatus complies with an IEEE802.11 standard series.

17. The apparatus according to claim 13, wherein the first information contains information of a timing to transit to the communicable state.

18. The apparatus according to claim 13, wherein the communicable state is an Awake state in an IEEE802.11 standard series.

19. The apparatus according to claim 13, wherein the first other communication apparatus complies with the IEEE802.11ax standard.

20. A method for controlling a communication apparatus functioning as an access point, the method comprising:

receiving a TWT request from a first other communication apparatus;

transmitting a TWT response to the first other communication apparatus, the TWT response including information indicating listen interval; and transmitting a plurality of beacons, wherein the plurality of beacons include a first type of beacon that is periodically transmitted based on the listen interval and that contains a TWT IE, Information Element, and a second type of beacon that is not periodically transmitted based on the listen interval and that does not contain the TWT IE;

performing, with the first other communication apparatus that can operate in accordance with first information that is related to Target Wake Time (TWT) and that is schedule information for putting another communication apparatus into a communicable state, communication based on the first information, wherein the first other communication apparatus is included in a network formed by the communication apparatus; and setting, in a case where a second other communication apparatus that cannot operate in accordance with the first information is included in the network formed by the communication apparatus, a Network Allocation Vector (NAV) for the second other communication apparatus.

* * * * *